US008527457B2

(12) United States Patent
Moon et al.

(10) Patent No.: US 8,527,457 B2
(45) Date of Patent: Sep. 3, 2013

(54) ARRANGEMENT FOR AUTONOMOUS MOBILE NETWORK NODES TO ORGANIZE A WIRELESS MOBILE NETWORK BASED ON DETECTED PHYSICAL AND LOGICAL CHANGES

(75) Inventors: Billy Gayle Moon, Cary, NC (US); Pascal Thubert, La Colle sur Loup (FR)

(73) Assignee: Cisco Technology, Inc., San Jose, CA (US)

( * ) Notice: Subject to any disclaimer, the term of this patent is extended or adjusted under 35 U.S.C. 154(b) by 2368 days.

(21) Appl. No.: 10/679,312

(22) Filed: Oct. 7, 2003

(65) Prior Publication Data
US 2005/0076054 A1    Apr. 7, 2005

(51) Int. Cl.
*G06F 7/00*        (2006.01)
*G06F 17/30*       (2006.01)

(52) U.S. Cl.
USPC ........... 707/620; 707/603; 707/610; 707/626; 707/634; 707/636

(58) Field of Classification Search
USPC ...................................... 707/100, 103; 705/1
See application file for complete search history.

(56) References Cited

U.S. PATENT DOCUMENTS

| | | | |
|---|---|---|---|
| 5,517,618 A | 5/1996 | Wada et al. | |
| 5,634,010 A | 5/1997 | Ciscon et al. | |
| 6,172,986 B1 | 1/2001 | Watanuki et al. | |
| 6,327,594 B1 | 12/2001 | Van Huben et al. | |
| 6,542,925 B2 | 4/2003 | Brown et al. | |
| 6,587,882 B1 | 7/2003 | Inoue et al. | |
| 6,748,233 B1 | 6/2004 | Arnold et al. | |
| 6,763,013 B2 | 7/2004 | Kennedy | |
| 6,763,014 B2 | 7/2004 | Kennedy | |
| 6,765,892 B1 * | 7/2004 | Leung et al. | 370/332 |
| 2003/0005030 A1 | 1/2003 | Sutton et al. | |
| 2004/0030450 A1 | 2/2004 | Solomon | |
| 2004/0030571 A1 * | 2/2004 | Solomon | 705/1 |
| 2004/0057409 A1 * | 3/2004 | Kennedy | 370/338 |
| 2004/0134336 A1 * | 7/2004 | Solomon | 89/1.11 |

OTHER PUBLICATIONS

Peter Burden, Routing in the Internet, Aug. 14, 2002.*
Gabriel T Sibley, Mohammad H. Rahimi, & Gaurav S. Sukhatme, Robomote: A Tiny Mobile Robot Platform for Large-Scale Ad-Hoc Sensor Networks, May 2002, Proceedings of the 2002 IEEE International Confrence on Robotics & Automation, pp. 1143-1148.*

(Continued)

*Primary Examiner* — Sangwoo Ahn
(74) *Attorney, Agent, or Firm* — Leon R. Turkevich

(57) ABSTRACT

An autonomous wireless mobile network is established between mobile nodes configured as wireless autonomous robotic mobile access points. Each mobile node includes a mobility platform, an executable routing resource, and a standardized interface. The mobility platform is configured for supplying sensor data from attached physical sensors, and responding to motor commands from the standardized interface. The standardized interface is configured for converting each sensor datum into a corresponding sensor object, and converting received movement directives into the respective motor commands. The executable routing resource is configured for maintaining a database of world objects representing attributes within an infosphere established by the wireless mobile network based on the sensor objects and received network objects. The executable routing resource also is configured for generating the received movement directives and executing network decisions based on periodic evaluation of the world database, and exchanging the world objects with other mobile nodes.

41 Claims, 10 Drawing Sheets

(56) References Cited

OTHER PUBLICATIONS

Gabriel T. Sibley, Mohammad H. Rahimi & Gaurav S. Sukhatme, Robomote: A Tiny Mobile Robot Platform for Large-Scale Ad-Hoc Sensor Networks, May 2002, Proceedings of the 2002 IEEE International Conference on Robotics & Automation, p. 1143-1148.*

Peter Burden, Routing the Internet, [online], Jan. 17, 1999, [retrieved Apr. 11, 2006], retreived from www.scit.wlv.ac.uk/~jphb/comms/iproute.html, pp. 1-8.*

Johnson et al., "Mobility Support in IPv6", Internet Draft, IETF Mobile IP Working Group, draft-ietf-mobileip-ipv6-24.txt, Jun. 30, 2003, http://www.ietf.org/internetdrafts/draft-ietf-mobileip-ipv6-24.txt.

Object Management Group, "OMG Unified Modeling Language Specification", Version 1.5, Mar. 2003, http://www.omg.org/docs/formal/03-03-01.pdf.

Johnson et al., "Mobility Support in IPv6", Internet Draft, IETF Mobile IP Working Group, draft-ietf-mobileip-ipv6-24.txt, Jun. 30, 2003, http://www.ietf.org/internetdrafts/draft-ieff-mobileip-ipv6-24.txt (pp. 1-172).

Object Management Group, "OMG Unified Modeling Language Specification", Version 1.5, Mar. 2003, http://www.omg.org/docs/formal/03-03-01.pdf (all 736 pages).

* cited by examiner

ARRANGEMENT FOR AUTONOMOUS MOBILE NETWORK NODES TO ORGANIZE A WIRELESS MOBILE NETWORK BASED ON DETECTED PHYSICAL AND LOGICAL CHANGES

BACKGROUND OF THE INVENTION

1. Field of the Invention

The present invention relates to wireless networking, and techniques for organizing, on an ad hoc basis, mobile networks using unmanned devices or vehicles that are movable over a geographic area.

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has two working groups focusing on mobile networks, a Mobile Ad-hoc Networks (MANET) Working Group that is working to develop standardized MANET routing specification(s) for adoption by the IETF, and NEMO (mobile networks). NEMO uses Mobile IP (MIP) to provide connectivity between mobile networks and the infrastructure (e.g., the Internet). The key component in NEMO is a mobile router that handles MIP on behalf of the mobile networks that it serves.

According to the MANET Working Group, the "mobile ad hoc network" (MANET) is an autonomous system of mobile routers (and associated hosts) connected by wireless links—the union of which form an arbitrary graph. The routers are free to move randomly and organize themselves arbitrarily; thus, the network's wireless topology may change rapidly and unpredictably. Such a network may operate in a standalone fashion, or may be connected to the larger Internet.

A "Mobile IPv6" protocol is disclosed in an Internet Draft by Johnson et al., entitled "Mobility Support in IPv6" and identified by the designation "draft-ietf-mobileip-ipv6-24.txt", available on the World Wide Web at the IETF website "ietf.org".

The above-described mobile networking protocols, however, are merely concerned with IP-based connectivity, and rest on the assumption that wireless link establishment and node mobility are uncontrollable factors outside the scope of the mobile networking protocol.

Remote-controlled devices have been used to provide remote sensing and remote interaction with respect to hostile (e.g., dangerous) environments or locations that are not practical for human intervention. Such remote-controlled devices have included terrestrial robots, aerial drones, satellites, marine or submersible drones, and unmanned spacecraft. Typically these remote-controlled devices have relied on a wireless link with a control station that provides direct control over the operations of the remote-controlled devices; as the remote-controlled devices obtain additional processing power and memory storage capabilities, the degree of real-time controller intervention via the control station is reduced. Still, at some point the remote-controlled device, upon lacking sufficient information to execute an operation, will reach a state where it enters a standby mode while awaiting further instructions from the control station.

Of particular interest is the ability to organize mobile elements within a pervasive network. The term "pervasive network" refers to a network where every thing, device, and user can be continually connected to a common network fabric. Use of a pervasive network would be particularly beneficial in military or rescue operations, where a system (e.g., a mobile network of robotically-controlled mobile nodes) can be quickly deployed (in a manner of hours) without the necessary of manual configuration of each and every mobile node.

Efforts in attempting to implement and deploy a pervasive network have uncovered numerous problems. Attempts for rapid deployment in a given area may encounter operational difficulties if the area of deployment cannot support continuous coverage of each individual mobile node. In addition, changes in topology and the location of the coverage may change at a rapid and unpredictable pace, risking signal loss between various mobile nodes.

One attempt to minimize signal loss is to combine satellite communications (offering wide area coverage) and mobile communications. Use of satellite communications, however, has its own associated problems: satellites are expensive, fragile, and have a limited bandwidth and a limited time interval of line-of-sight availability in the case of satellites that do not have a geostationary orbit. Further, the required power for a mobile base station to transmit to and from a satellite can be both cost prohibitive and dangerous, since the signal transmission can be detected by hostile forces. In addition, there is no established protocol for coordinating land-based mobile nodes and satellites with respect to network management and communications support. Further, military and or rescue operations may need to adopt an inefficient organizational structure in order to accommodate the communications topology inherent in the wireless network.

Still in other systems, such as APCO16 and APCO25 systems (promulgated by the Association for Public-Safety Communications Officials) that service the public safety networks (police, fire and ambulance), wireless technologies are typically deployed using fixed nodes, namely towers and repeaters stationed over a given area of coverage in a logical fashion to provide robust communications during normal and "planned" conditions. However, during catastrophic or unplanned situations (such as a terrorist attack) those fixed node-based systems may not be able to provide adequate coverage to support rescue or police operations.

One technology that has been deployed to support ad hoc rescue operations is a "vehicular" repeater. This allows a vehicle, for example a police car, to act as a repeater for the network. The officer drives his vehicle to a certain area and the vehicle has a "higher power" repeater in it. The officer and others can then use their lower power portable radios to communicate through the repeater within the vehicle thereby extending their range.

This vehicular repeater, however, has several limitations. First, the vehicle must be driven to a specific point by a human driver and that point might not be reachable or might not be a place where the driver needs (or wants) to go. Second, the vehicle only acts as a repeater back to the fixed infrastructure and cannot support local communications. Third, the repeater has limited bandwidth. Fourth, the repeater cannot account for portable devices having varying power requirements.

Yet another common capability is the ability of public safety and military portable radios to enter "talk around mode". In talk around mode, one or more users choose to communicate point to multi-point with a specific group of users. This is a manual process and requires a decision on the part of the users to enter talk around mode. Additionally, while in talk around mode, the user is typically disconnected from wide area communications. Finally, there is no means to enable members of the "group" to transition from a local communications (akin to wireless LAN) to distant communications (akin to wireless WAN) in situations that may occur as members move positions, as may happen on a battle field or during a emergency situation.

SUMMARY OF THE INVENTION

There is a need for an arrangement that enables mobile network nodes to autonomously mobilize a network, where at least a number of the mobile network nodes are capable of autonomous movement using an associated mobility platform.

There also is a need that enables autonomous devices, for example robots, airborne drones, or marine/submersible drones, to be integrated with mobile routing technology into an autonomous mobile network, where the autonomous devices independently execute decisions related to network routing, wireless link establishment and maintenance, and device positioning and movement, based on a unified collection of inputs and state information related to the physical world and network topology of each of the individual autonomous devices and the autonomous mobile network as a whole.

These and other needs are attained by the present invention, where a wireless network is established between network nodes which can be configured as wireless autonomous robotic mobile access points. Each node includes a mobility platform, and an executable routing resource. The mobility platform is configured for supplying sensor data from attached physical sensors, and responding to commands such as motor commands. Each sensor datum is converted into a corresponding sensor object according to a vector space relative to the attribute measured by the corresponding sensor. The received movement directives also are converted into respective mobility commands (e.g., robotic commands, packet routing commands, etc.). The executable routing resource is configured for maintaining a database of world objects representing attributes within an infosphere established by the wireless network based on the sensor objects and network objects received by the executable routing resource. The executable routing resource also is configured for generating the received movement directives and executing network decisions based on periodic evaluation of the world object database, and exchanging the world objects with other network nodes for synchronization of the respective databases of world objects.

Hence, the nodes can operate autonomously to execute coordinated decisions for optimized operations with respect to both physical operations and wireless network operations. Moreover, the exchanging of world objects enables the network nodes to establish a self-adapting, autonomous wireless network that can adjust to detected changes in physical space, geographic space, network topology space, or wireless link space.

One aspect of the present invention provides a method in a network node. The method includes establishing within the network node a world object database that stores world objects. The world objects represent respective attributes of an infosphere of a network that includes the network node. The world object database also includes smart world objects as a subclass of the world objects and that are configured for generating decisions based on evaluation of selected world objects. The method also includes adding, as world objects to the world object database, sensor objects from sensor data generated in response to detected attributes within the infosphere. The sensor objects include network node objects associated with the network node. The method also includes forming the network. The network is formed based on: (1) discovery of other network nodes, (2) adding second network node objects as world objects to the world object database and representing attributes of the other network nodes, and (3) sharing the world objects with the other network nodes. The method also includes performing a change in at least one of position, velocity, orientation, and wireless communication characteristics of the network node based on detecting a world object specifying a directive based on at least one of the decisions.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The disclosed embodiment is directed to establishment of a routing protocol that implements an autonomous solution for deployment of a mobile network having movable network nodes configured for independently moving to an optimum position, relative to the other network nodes (movable and fixed). By way of introduction, the routing protocol provides a wireless and autonomous robotic mobile access point.

The routing protocol of the disclosed embodiment considers movement of its physical platform as an option to optimize routing metrics, where each movable network node includes routing resources, a mobile platform, and a standardized interface between its routing resources and its mobile platform.

Figure 1:
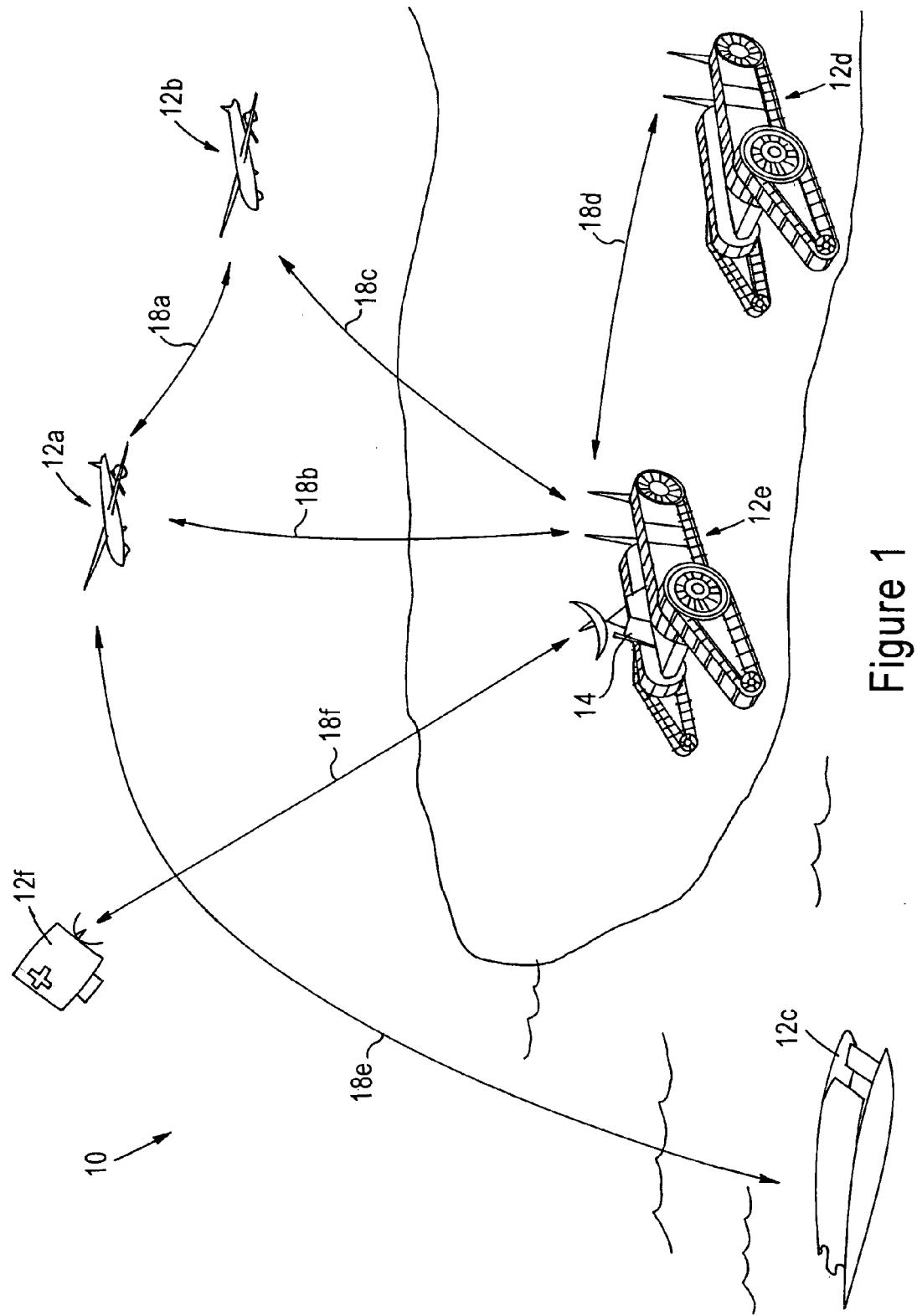
FIG. 1 is a diagram illustrating an autonomous wireless mobile network comprising mobile nodes configured as wireless autonomous robotic mobile access points, according to an embodiment of the present invention.

FIG. 1 is a diagram illustrating mobile nodes having various implementations of mobile platforms that may be used for deployment of the mobile network 10: the mobile network 10 may include an airborne drones 12a, 12b, a marine or submersible drone 12c, a terrestrial drone 12d and 12e, and/or a spacecraft drone 12f. Note that a mobile platform may include a robotic system 14 configured for moving a transmit/receive antenna 16 to a selected orientation, for example in the case of a ground station antenna mounted on the terrestrial drone 12e. The disclosed mobile network may be used for applications including robotic-based rescue support communications, military deployments, remote exploration, intelligent sensor arrays, mobile control of cameras for security systems or sporting events, etc.

The mobile network 10 relies upon the establishment of communication links 18 between the different mobile nodes; as known in mobile networking technologies, the communication links 18 are established dynamically between respective network nodes 12 depending on the relative signal strength and propagation characteristics, as well as resistance to interference (e.g., geographic, atmospheric, RF-induced including jamming). Hence, a given network node (e.g., 12a) may serve as a relay for other network nodes (e.g., 12c, 12b) that do not have a direct link.

Each of the network nodes 12 includes at least one (preferably multiple) LAN/WAN wireless interface for IP-based communication with other network nodes. In particular, each network node 12 preferably has multiple wireless interfaces that can be utilized depending on proximity of other network nodes and relative signal strength; for example, if a network node 12 travels a substantial distance from other network nodes, the traveling network node 12 may switch from using a low-power LAN interface to a higher-power WAN interface. Each of the network nodes 12 also include IP-based routing resources that enable the network nodes 12 to establish the mobile network 10 between themselves, for example on an ad hoc basis, based on mutual discovery operations, and sharing of information associated with the discovery operations, including identifying network topology, etc., in the form of IP-based packets.

A particular feature of the network nodes 12 is that they understand not only the connectivity of each of the nodes 12 relative to each other, but the network nodes 12 also understand metrics about the connectivity, including packet error rate, bandwidth delay, latency, etc., that are typically recognized on an OSI layer 2 (link layer) connection, as well as OSI layer 1 (physical layer) factors such as signal strength.

In addition, the mobile nodes 12 are configured to recognize that numerous constraints may limit the physical positioning of the mobile nodes 12, both in terms of maintaining a communication link 18 and maintaining the viability of the network node itself. Such constraints may include geography, building integrity, presence of interference or obstructions, geopolitical constraints (e.g., airspace avoidance or marine navigation constraints), threat avoidance, etc.

As described above, the routing protocol of the disclosed embodiment considers movement of its physical platform as an option to optimize routing metrics. Hence, the routing resources of each mobile node include movement of its physical platform, and all factors and consequences associated with executing decisions related to movement, as part of the decision-making process to determine how to respond to inputs, including how to route data packets. Each of these factors are also shared among the mobile nodes 12 to provide a level of understanding between all the mobile nodes 12 as to the state of the network 10 from the perspective of each of the individual nodes 12.

Hence, each of the mobile nodes 12 decide how to route packets, and move their respective mobility platforms, based on the available information from local sensors and information shared between the other mobile nodes. Consequently, the mobile network 10 becomes a dynamic entity where the individual mobile nodes 12 interact to route packets, establish connections among each other, and move at selected velocities as needed, based on shared information and detected information.

Hence, the mobile network 10 can be deployed within a geographic area without actually programming the geographic topology or network topology within the mobile nodes. As an example, in the case of an emergency where a building has collapsed, the mobile nodes 12 (implemented as movable robots) could follow each other (e.g., led by a robot having proximity sensors, controlled by a rescue worker, or following a human rescue worker) to provide an RF chain despite poor RF characteristics within the collapsed building. Further examples may involve incorporating the mobile network 10 within military deployment of ground troops, naval vessels, aerial drones, or any combination thereof.

Figure 2:
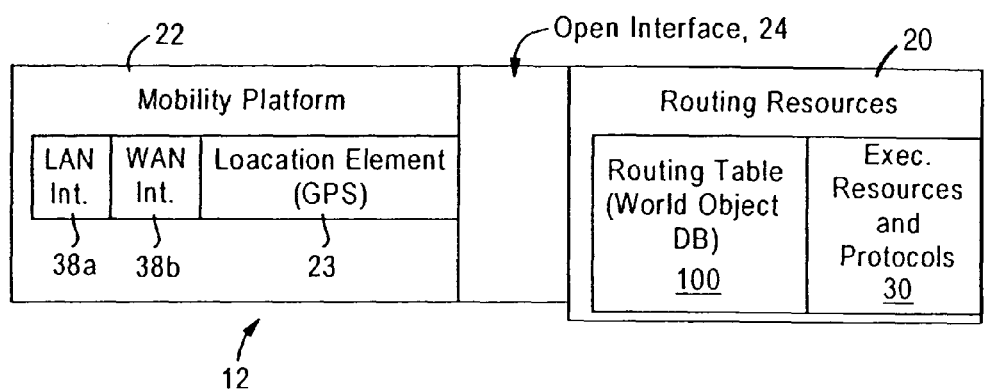
FIG. 2 is a diagram illustrating one of the mobile nodes of FIG. 1 according to an embodiment of the present invention.

FIG. 2 is a diagram illustrating in further detail an exemplary mobile node 12. The mobile node 12 includes IP router-based routing resources 20, a mobility platform 22, and an interface 24. The routing resources 20 are configured for execution of the routing protocol for the corresponding mobile node 12. The mobility platform 22 is configured for supplying physical sensor data associated with physical attributes of the mobile node 12, and data received from other wireless devices, and implementing the movement directives generated by the routing resources 20. For example, the mobility platform 22 includes a location element 23 (e.g., a GPS receiver), configured for identifying the location of the mobility platform.

The routing resources 20 include a routing table 100, also referred to as a "World Object Database", and executable resources and protocols 30. The executable resources and protocols 30 implement all decisions related to operation of the mobile node 12, including routing of packets, movement of the mobile node 12 by the mobility platform 22, selecting wireless interfaces for transmission and reception of wireless data, and adjusting gain for wireless transmission and reception.

As described below, the executable resources and protocols 30 implement the operational decisions based on accessing relevant data objects from the world object database 100, and generating directives in the form of data objects for storage in the world object database 100.

Figure 3:
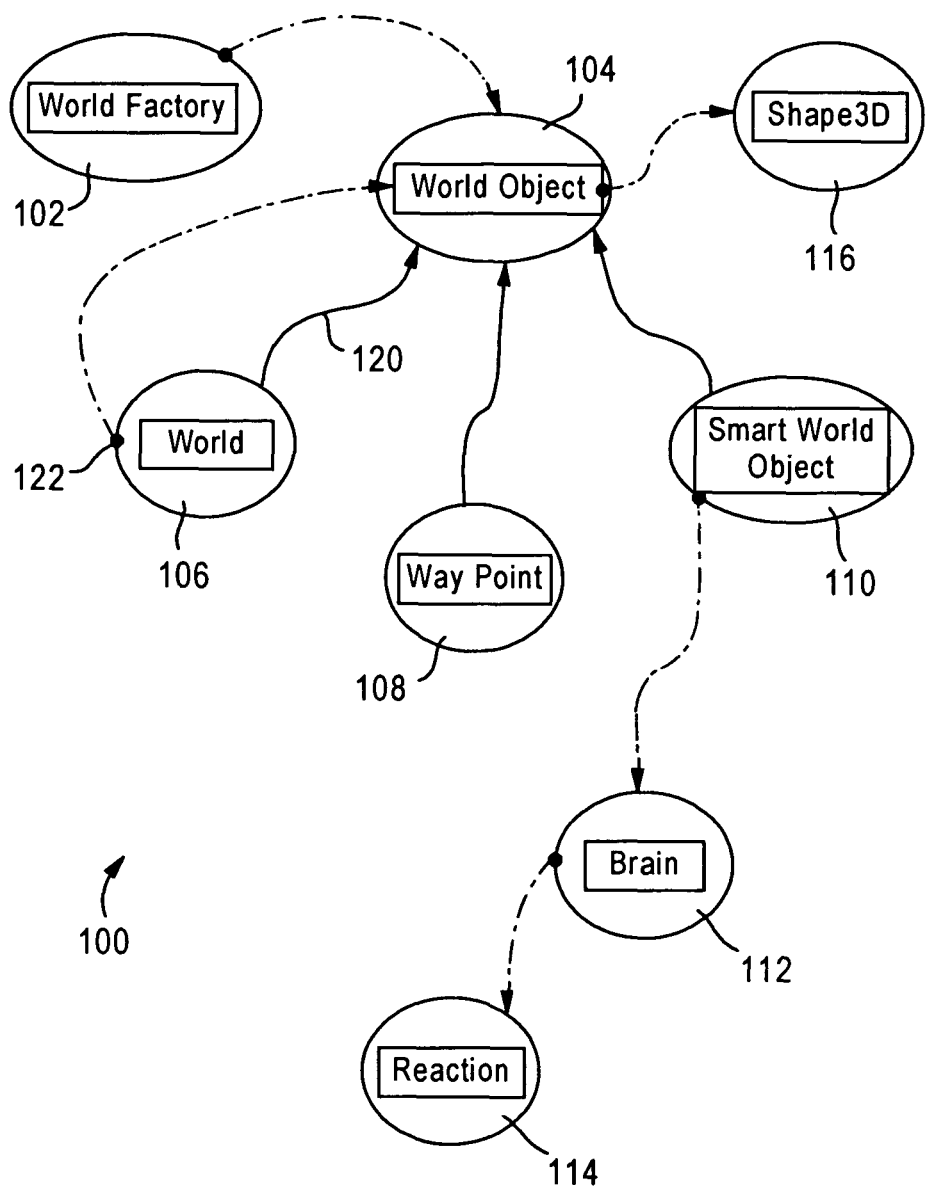
FIG. 3 is a object relationship diagram illustrating relationships between different objects from the world object database of FIG. 2.

FIG. 3 is a diagram illustrating the world object database 100 according to an embodiment of the present invention. The world object database 100 represents a model of the "world" as perceived by the mobile node 12, including inheritance of objects from the other mobile nodes 12 within the mobile network 10. Hence, the world object database 100 encompasses all attributes associated with the mobile network 10 (i.e., the "infosphere"). As described below, infosphere (i.e., the attributes associated with the mobile network 10), including for example network topology, geographic and physical parameters of the region encompassed by the mobile network 10, routing of data packets by a mobile node 12, etc., are represented using data objects represented according to multiple n-dimensional vectors that can be transformed based on transformational matrices.

By way of analogy, devices such as Internet Protocol (IP) routers that implement existing routing protocols such as Internet Protocol typically construct a "forwarding table" as used to determine the "next hop" for a packet. A router's forwarding table can be considered an example of a three-dimensional vector space; however, since IP networks tend to be hierarchal in nature due to their addressing schemes (i.e., a subnetwork is identified as within a network based on using subnet prefixes), the forwarding tables can be simplified to a two-dimensional mapping (network prefix: next hop) by following the implied hierarchical structure of the network while searching the forwarding tables.

Consequently, a forwarding table in a router can be represented as a three-dimensional vector space (i.e., a "World") that includes a coordinate system: each coordinate system is based on a prescribed reference point (e.g., an origin, waypoint, etc), and a coordinate system for identifying a second position (e.g., a waypoint) relative to the prescribed reference point in prescribed units (Cartesian coordinates, Geodesic coordinates, polar coordinates, etc.). Since numerous coordinate systems are available, a given World (also referred to as a world domain) may include a native coordinate system, and a coordinate transform (i.e., transformation of vector space) that enables the waypoint to be transformed to a second coordinate system for use in a second vector space for identification by another world object.

Examples of traditional vector spaces include network masks having various lengths (i.e., bits), hop count, bandwidth, network address, etc. For example, a top-level object, represented in FIG. 3 below as a top-level container 104, would contain a/0 prefix of IP addresses; the top-level container would contain four (4) containers for Class A, B, C and D networks, respectively; each container for one of the Class A, B, C or D networks in turn contain additional containers for respective networks. This hierarchal model can be converted into a tuple space (i.e., a vector space), that has transformation matrices for transforming a vector space into another vector space; hence, a "distance" can be computed from one vector space for use in another vector space. An example of "distance" is hop count, minimum bandwidth, addresses, etc., each having an associated class of world objects; hence, a world object "hop count" would have within its top level container a group of containers, each for a corresponding hop count (1, 2, 3, 4, etc.), and within each specific hop count container (e.g., hop count=1) would be a next hop address.

As described below, the routing resources 20 manages data by modeling all data, including network parameters, into three-dimensional vector spaces; in addition, the creation of new vector spaces for physical parameters such as signal strength, Cartesian and Geodesic physical space, etc., enables generation of different tuple-space models such as an RF model that measures distance by signal power (dBm), a network topology model that measures distance by hop count, etc.

Each node includes a database of world objects having a hereditary tree: a world object is a basic object, where all objects are world objects, including the world (i.e., world domain), the waypoints, and the smart world objects.

FIG. 3 is a diagram illustrating a portion of the world object database 100, namely a class of objects known as "data containers". The world object database 100 provides an object-oriented model for all objects in the world. In particular, the world object database 100 includes a world factory 102 which owns a container 104 of world objects. There are three types of world objects 104: worlds stored in a world container (i.e., world domain) 106, waypoints stored in a waypoint container 108, and smart world objects stored in a smart world container 110. In addition, world objects 104 contain a "Shape 3D" container 116 that includes any set of polyhedrons (i.e., prescribed three-dimensional shapes). Note that FIG. 3 is written in accordance with the Uniform Modeling Language (UML) Specification Ver. 1.5, March 2003, published by the Object Management Group at their website "omg.org/uml" and more specifically at the address "omg.org/docs/formal/03-03-01.pdf" the disclosure of which is incorporated in its entirety herein by reference. In accordance with UML, the solid arrows on solid lines 120 point in the direction of inheritance; hence, the world 106 is a kind of (i.e., a subclass of) world object 104; a "dot" 122 on a dashed line implies ownership, such that the world 106 owns world objects 104; in other words, the world 106 is a container that contains one or more world objects 104. Similarly, the world object 104 owns the shape objects 116.

A "world" from the world container (i.e., world domain) 106 is a kind of world object 104 that can contain world objects 104, which can contain other worlds (i.e., world domains), and has a coordinate transform 130. Each world (i.e., world domain) has a base location and a transformation for the coordinates of the world objects they contain. As described above, world objects 104 have a hereditary tree, such that a world 106 may contain more world objects, enabling a hierarchy of a vector space to be developed.

Figure 4:
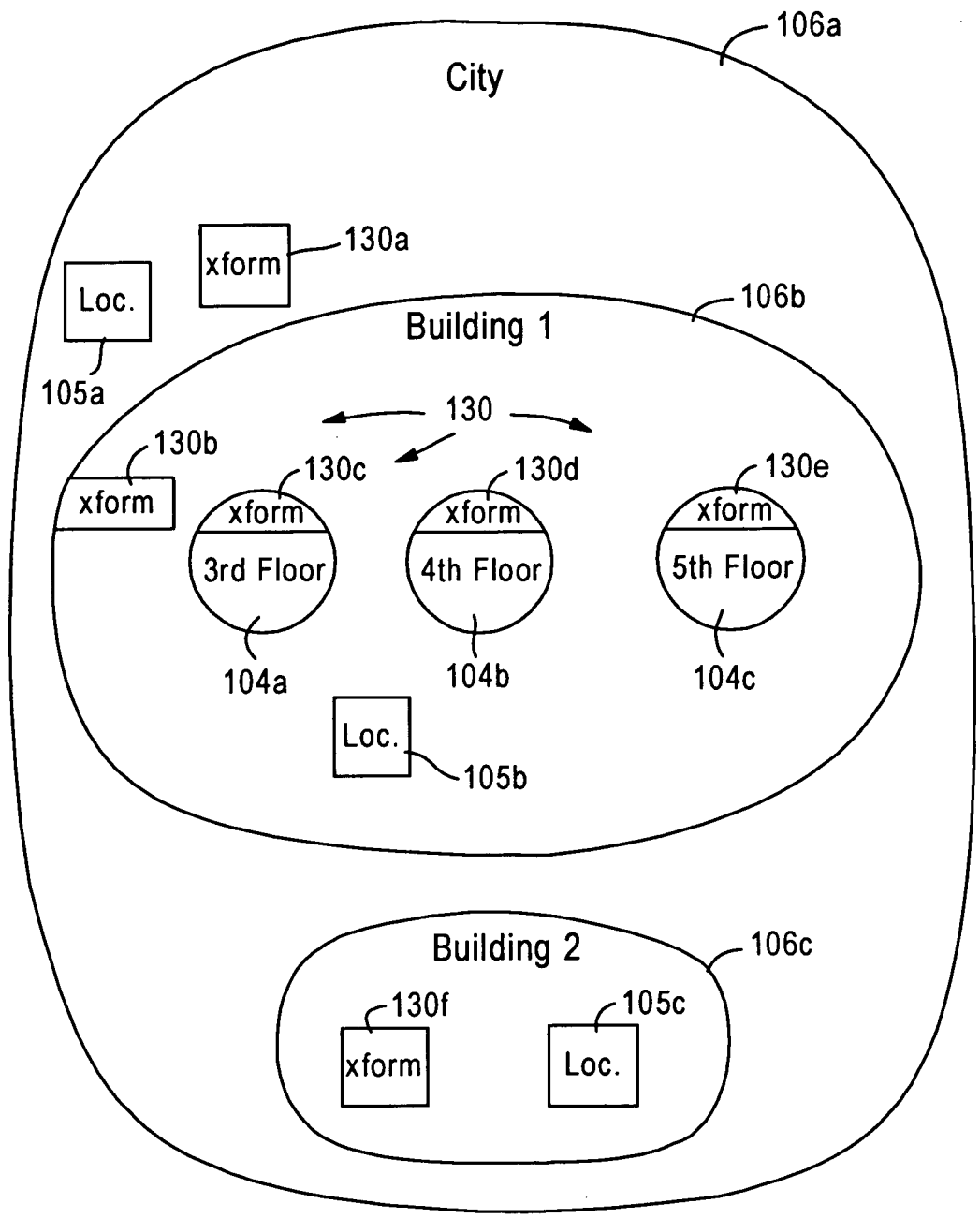
FIG. 4 is a diagram illustrating an object-based world from the world object database of FIG. 3 containing multiple objects.

FIG. 4 illustrates a "world" (i.e., world domain) 106a that encompasses a city and has a certain shape (i.e., the shape of the city) from the shape objects 116, a location 105a specified in a native coordinate space (e.g., GPS coordinates), and a coordinate transform 130a for mapping the native coordinate space into other vector spaces in the world object database 100. Each world 106 typically will encompass (i.e, contain or own) multiple objects that certain attributes within the domain of that world (also referred to as an infosphere), including a specified geographic area space based on position and shape, as well as physical space, RF space (e.g., signal characteristics relative to each node), network topology relative to each node, and physical parameters for each network node (including position, velocity, orientation).

The "parent" city 106a encloses "child" world domains 106b and 106c; as illustrated in FIG. 4, the world 106b encompassing (e.g., representing) a building within the city 106a and having a certain shape 116 and location 105b and having a corresponding coordinate transform 130b, and inside the building 106b are world objects 104a, 104b, and 104c for objects inside the building (e.g., floors) and having their own respective coordinate transforms 130c, 130d, 130e.

Hence, FIG. 4 illustrates the example where the universe is modeled as the world 106a, and the world 106a has a transformation 130a that serves as a universal transformation: the world objects 104a, 104b, and 104c that share the same types coordinates can "talk to each other" without any transformation; if, for example, the world objects 104a and 104b use different types of coordinates, the world object 104a could send a request to its "parent" object 106b to transform its native coordinates to the coordinate system used by the world object 104b; the world 106b would use its transformation 130b to perform the transformation. As such, the world objects 104a and 104b inherit the transformation capabilities of their parent object 106b; similarly, the worlds 106b and 106c inherit the transformation capabilities of their parent world 103a.

Note that the arrangement of FIG. 4 illustrates that worlds can be nested with additional worlds within worlds, etc., each with another layer of transformation 130, where vectors in one space can be transformed to another space.

Referring to FIG. 3, a waypoint object 108 is a kind of world object that represents a "place" or attribute in the world: the term "waypoints" is not limited to geographic waypoints as used by GPS systems, but also may specify a host computer or a certain router in a vector space utilizing hop count, GPS coordinates in a Geodesic vector space, dBm levels in an RF vector space, etc. Since the waypoint 108 is a world object, it has a shape since all world objects 104 own a shape from the shape container 116. Note that unlike worlds 106, waypoints 108 do not own world objects 104, hence a world object 104 cannot be added into a waypoint, but a world object 104 can be added into a world 106.

Since worlds (i.e., world domains) 106 are containers for other objects, each world 106 includes a transform 130 that is a matrix transformation for vectors representing the different vector spaces. Note that the "location" 105 of any given world object may be relative to different frames of references (i.e., coordinate spaces); in the case of a building, the building object 106b of FIG. 4 could be located using a street address relative to the city object 106a, or GPS coordinates, in which case the transform 130b and/or the transform 130a would be able to convert between the street address and GPS coordinates. Hence, vector mapping between different vector spaces is performed automatically using the transforms in each world, enabling the three-dimensional location and position vectors from different vector spaces to be compared and manipulated. In addition, different worlds and world objects can determine whether they share certain attributes and identify whether a vector transformation is needed.

Referring to FIG. 3, a smart world object 110 is a type of world object 104 and as such include all the properties of world objects 104, including having a shape 116. Each smart world object 110 also owns an object called a brain 112, and each brain 112 owns a set of reactions 114.

Brains 112 are responsible for "thinking" (in a heuristic manner) about the advice of each reaction 114, and then suggesting and forming a behavior (in the form of force vectors), also referred to as an "opinion", of what should be done.

A reaction 114 is an object that "behaves" by reacting to various stimuli (e.g., objects identifying current system conditions and/or state) by suggesting a change, in the form of a recommendation or "advice" element (which also may be a world object 104), to a brain 112 (which is a designated smart world object). In general reactions have an "influence factor" that the brain 112 might consider (e.g., a minimum and maximum radius that might be considered). In some cases the reactions are sensitive to a given target or group of targets.

Figure 5:
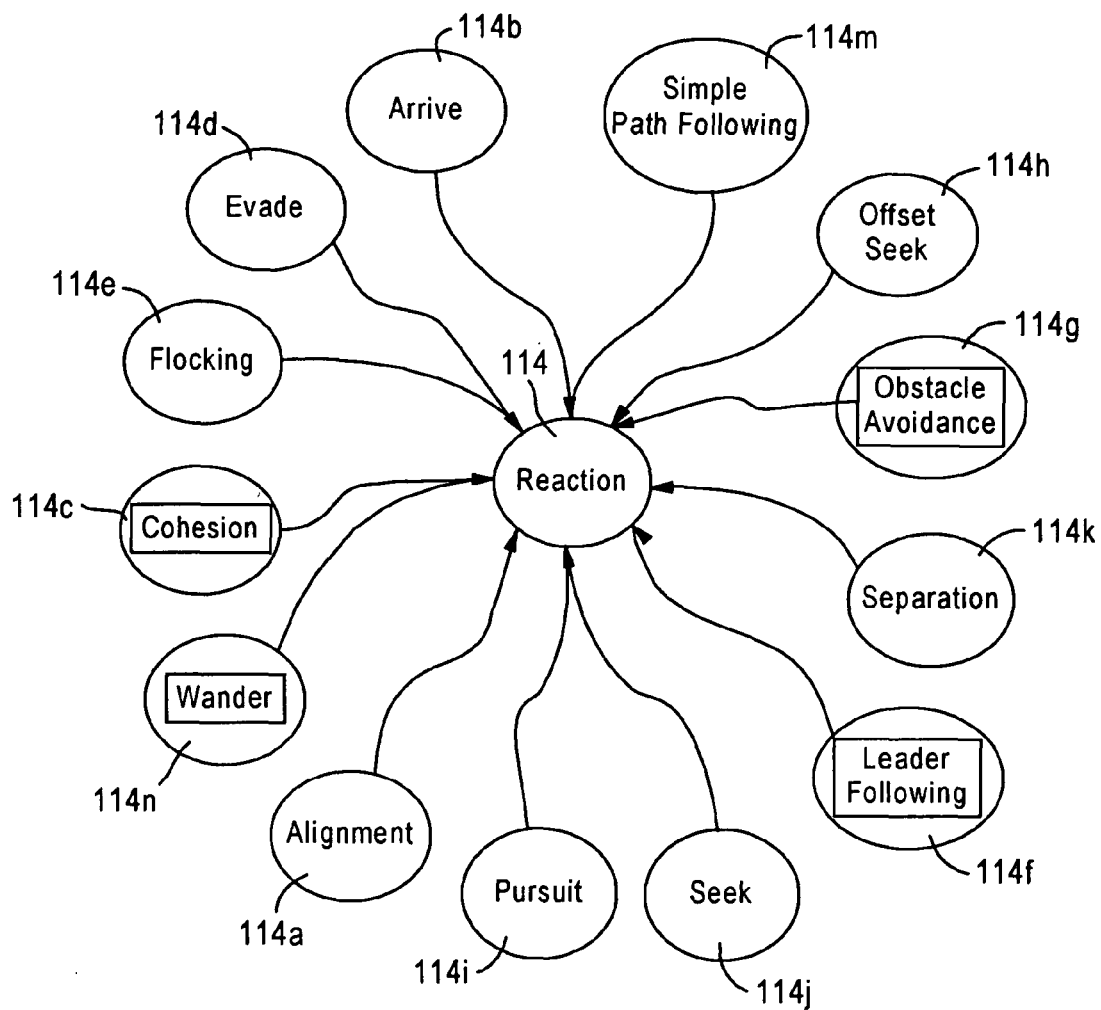
FIG. 5 is a diagram illustrating exemplary reaction objects that may be used in the world object database illustrated in FIGS. 2 and 6.

FIG. 5 is a diagram illustrating the different kinds of reactions 114. Reactions provide advice to the brain 112 in the form of a three-dimensional advice element. Reactions 114 work independently, and each reaction 114 may have an associated influence factor that the brain may use to reason with (i.e., use to reach an "opinion"). Reactions 114 use input factors such as space, signal strength, frequency, hop count, orientation, reasoning and other factors as their stimulus. Reactions also may consider various factors, including: position of itself; position of a target or a group of target world objects; nearness of other world objects; orientation of other world objections; predicted position of other world objects; Leaders and Groups; signal strength between world objects; distance to world objects; hop count to world objects; other link metrics between world objects.

The alignment reaction 114a seeks to align the mobile node 12 with some other group of mobile nodes 12. The alignment reaction 114a is effective within some minimum radius and out to some maximum radius.

The arrive reaction 114b sets a condition for arrival. This reaction 114b can qualify arrive as being within a certain radius of a physical location, being within a certain signal strength range or being within a certain packet hop count to a given destination. When the mobile node 12 "arrives" within the boundary conditions set, then arrive will say "stay here" with a given level of influence.

The cohesion reaction 114c attempts to cause the mobile node 12 to stay within a certain "distance" to a group of other network mobile nodes 12. Cohesion can be physical, signal strength or hop count driven.

The evade reaction 114d attempts to keep the mobile node 12 away from (evade) a given kind of object. Distance can be measured as physical or signal strength or hop count The flocking reaction 114e combines the effects of "cohesion" and "separation" with a group of world objects 104.

The leader following reaction 114f attempts to cause the mobile node 12 to maintain cohesion with a given "leader" world object.

The obstacle avoidance reaction 114g attempts to cause the mobile node 12 to avoid other world objects by maintaining a given separation from them.

The offset seek reaction 114h is a modified version of the leader following reaction 114f in which the goal is to cause the mobile node 12 to seek to an offset from the given leader.

The pursuit reaction 114i is a kind of reaction 114 that attempts to cause the mobile node 12 to get near a given world object. Nearness can be physical, signal strength or hop count. This is different than the seek reaction 114j in that the pursuit reaction 114i attempts to estimate the "next" position of its target rather than using its current position only as the seek reaction 114j does.

The seek reaction 114j is a kind of reaction 114 that attempts to cause the mobile node 12 to seek a given world object (i.e., a "target") given its current position, signal strength and hop count. Using only the target's current position (as opposed to estimating the next position) is the main difference between seek and pursuit. Note that "current" position can be characterized in terms of physical position, signal strength, or hop count.

The separation reaction 114k is a kind of reaction 114 that attempts to maintain a minimum separation between the mobile node 12 and other world objects. Separation can be distance, signal strength or hop count.

The simple path following reaction 114m is a kind of reaction 114 that moves the mobile node 12 through a set of given waypoints 108.

The wander reaction 114n is a kind of reaction 114 that "randomly" changes the mobile node 12. It can randomly change the power output, position, frequency or route to other world objects. The randomness can be cryptographically random or simple random behavior.

Note that the reactions 114 of FIG. 5 are merely illustrative of mobility-based reactions; similar reactions would be implemented for routing packets, selecting wireless communication links, adjusting RF link power, etc.

The executable algorithms of the brain objects 112 and the reactions objects 114 of FIG. 3 operate on all of the vector spaces modeled in the world object database 100 transparently, such that the container of world objects 104 is an abstract set of objects, and the brain objects 112 and the reactions objects 114 formulate reactions and behavior on top of a set of world objects 104; those world objects 104 provide a uniform set of transformations.

Hence, the world object database 100 provides a model for executing decisions based on physical movement and logical movement: one aspect is modeling the data in a manner as illustrated by the world object database 100 such that differences in data types are inconsequential; another aspect is implementing iterative decision-making processes in view of the objects in the world object database 100. As described below, the brain 112 and the reactions 114 manage the decision making in the mobile node 12. Note that all of the world objects 104, brains 112, shapes 116 and reactions 114 are owned by (i.e., controlled by) the world factory 102 and are constructed from Extensible Markup Language (XML) tags.

Figure 6:
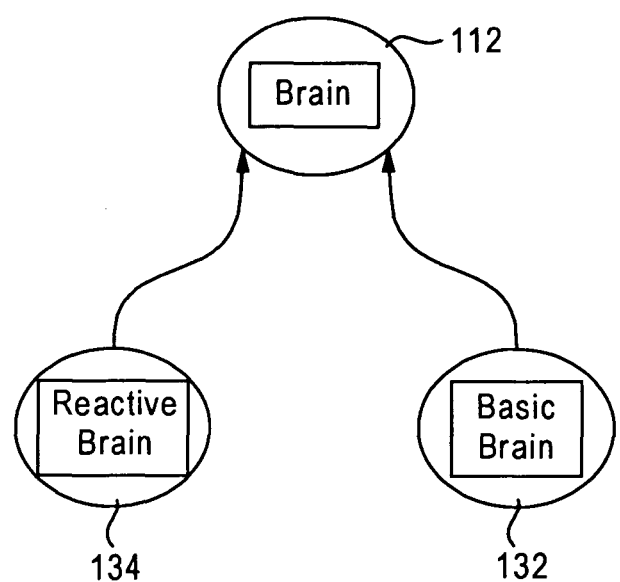
FIG. 6 is a diagram illustrating exemplary brain objects that may be used in the world object database illustrated in FIGS. 2 and 3.

FIG. 6 illustrates two types of brains 112: a basic brain and a reactive brain. The basic brain 132 is configured for scaling the respective reactions 114 (i.e., the advice elements supplied from the reactions 114) by an influence factor and then summing the scaled reactions to obtain a total reaction; the total reaction is then scaled to fit within a maximum reaction.

In contrast, the reactive brain 134 sorts the reactions 114 based on the influence factor and adds the influence of each reaction until a maximum reaction is reached. Note that the influence factor may be a simple scalar for all reactions, or may be a specific value for each corresponding reaction 114.

The architecture illustrated in FIGS. 3-6 are implemented by storing the objects as data structures in a tangible nonvolatile memory that is readable by a processor. The memory includes a memory that stores a table representing the world factory 102; the world factory 102 has entries for the world objects 104. The world 106, waypoint 108, and smart world objects 110 are tables stored within the memory storing the world objects 104.

Figure 7:
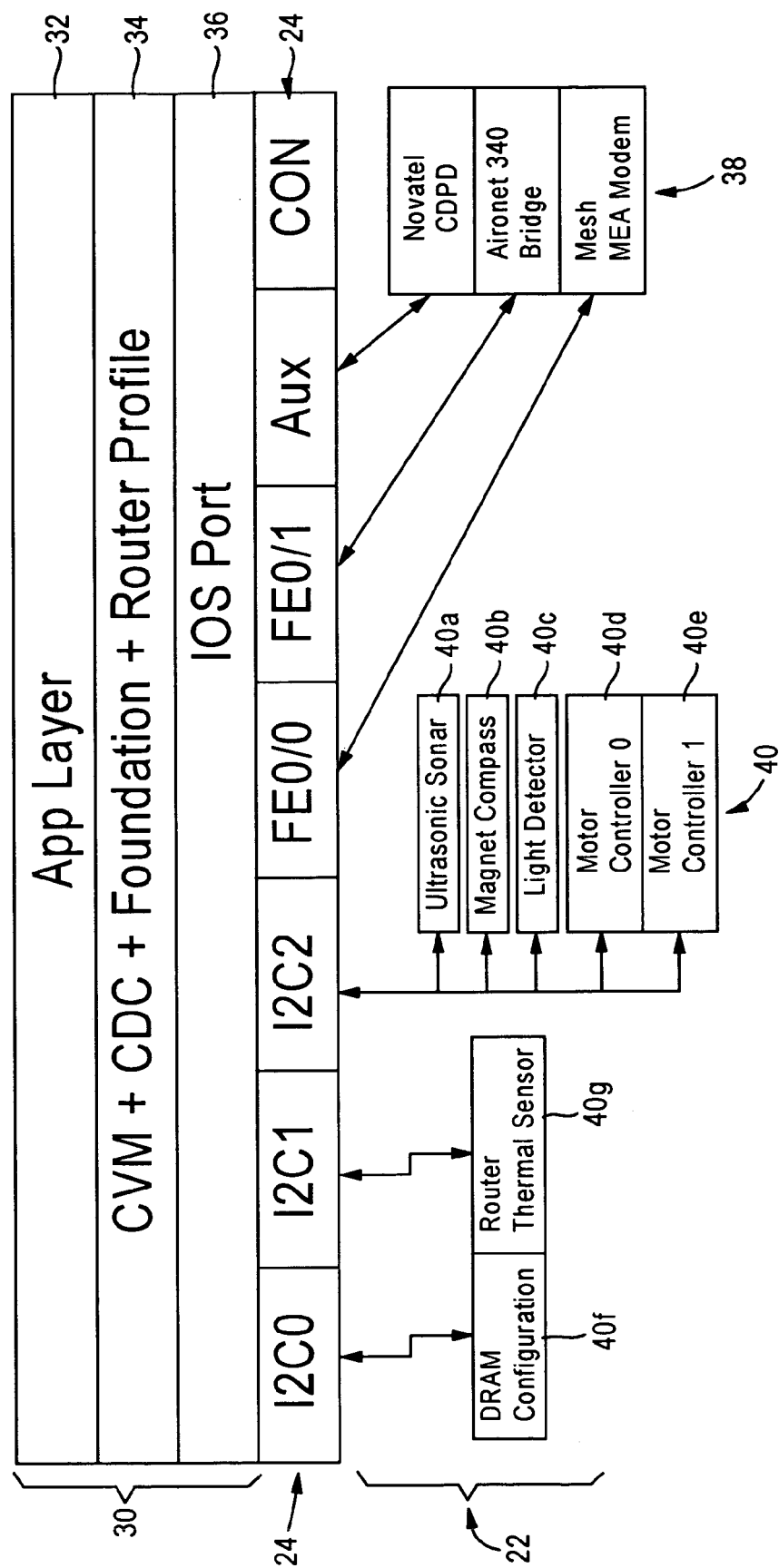
FIG. 7 is a diagram illustrating a software-based architecture of the executable processes portion of the mobile node of FIG. 2.

FIG. 7 is a diagram illustrating in further detail one implementation of the executable resources 30, the interface 24, and the mobility platform 22 of FIG. 2 according to an embodiment of the present invention. Different implementations using different interfaces, capabilities, and operating systems can be constructed according to the disclosed embodiment.

The executable resources 30, illustrated as a software stack, includes an application software layer 32, a collection of Java-based executable routines 34, and a network operating system layer 36 such as the commercially-available Cisco IOS from Cisco Systems, Inc. The IOS layer 36 interfaces with the physical interface device layer 24.

The physical interface device layer 24 includes three I²C ports (I2C0, I2C1, I2C2), two Fast Ethernet Ports (FE0/1, FE0/1), an auxiliary serial port (Aux), and a Console port (CON) for interfacing with selected portions of the mobility platform 22. The physical interface device layer 24 is coupled to radio devices 38 enabling wireless LAN/WAN connectivity to other platforms. Exemplary radio devices include a cellular packet data (CDPD) radio 38a, or other wireless radio technology, including a location service such as GPS.

The I2C2 port is configured for interfacing with robotic components 40, including for example an ultrasonic sonar 40a, a magnetic (fluxgate) compass 40b, a light detector 40c, and motor controllers 40d and 40e. The I2C0 port is configured for configuring (and reading/writing) a DRAM 40f, and the I2C1 port is configured for monitoring a router thermal sensor 40g.

The executable resources and protocols 30 continually execute operations to maintain the mobility platform 22 (including auto-piloting the mobile node 12), and performing IP packet routing. These operations are implemented based on the following interactions: between the mobility platform 22 and the world object database 100; between brains 112, reactions 114, and the world object database 100; and between the mobile nodes 12 via the wireless interfaces. These interactions each involve the world object database 100, which serves as the "glue" between the mobile nodes 12 and the real world. The brains 112 and reactions 114 interact with the world 106, and the mobile nodes 12 interact with each other through a world object exchange protocol.

Figure 8:
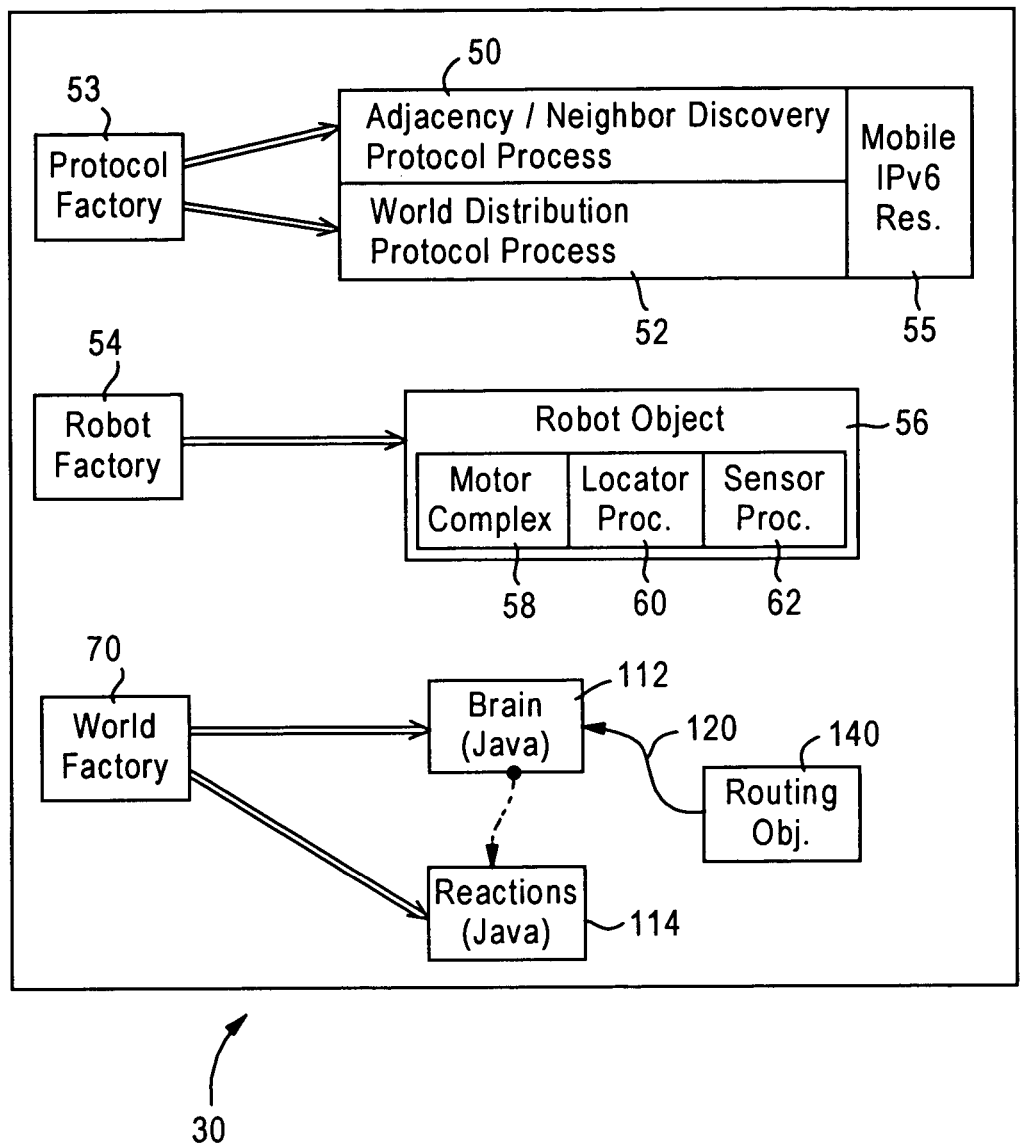
FIG. 8 is a diagram illustrating the executable application-layer resources of FIG. 3.

FIG. 8 is a diagram illustrating in further detail the executable processes 30 executed in a runtime environment by the routing resources 20 of FIG. 2. Each of the executable processes 30 described in FIG. 8 operate independently of each other.

The executable processes 30 that implement the wireless and autonomous robotic mobile access point include an adjacency or neighbor discovery protocol process 50 (in the application layer 32) used to find potential neighbors in the mobile network 10. The adjacency or neighbor discovery protocol process 50, similar to existing router discovery protocols in an IP network, is configured for finding reachable neighbors and creating an adjacency list of neighbors.

The executable processes 30 also include a world distribution protocol process 52 (in the application layer 32) configured for distributing the objects of the world object database 100 to the neighbors discovered by the adjacency or neighbor discovery protocol resource 50. The world distribution protocol process 52 independently attempts to synchronize and distribute its view of the "world" (i.e., its perspective) as reflected in its world object database 100. Both the adjacency protocol process 50 and the world distribution protocol process 52 are instantiated by a protocol factory process 53, and communicate with the other mobile nodes 12 using a mobile IPv6 protocol resource 55.

The executable processes 30 also include a robot factory process 54 (in the application layer 32) configured for instantiating a Java-based robot object 56 (in the Java layer 34) for each smart world object 110 in the world object database 100; hence, each smart world object 110 has a corresponding robot object 56. Each robot object 56 includes a motor complex 58, a locator process 60, and a sensor process 62. The robot object 56 is not associated with the processes 50 or 52, and is not involved with the brain 112; rather, the robot object 56 is a smart world object 110 that is populated into the database 100 by the robot factory 54 when the system starts, and which interacts with the brain object 112 via force vectors, velocity vectors and/or position vectors.

Figure 9:
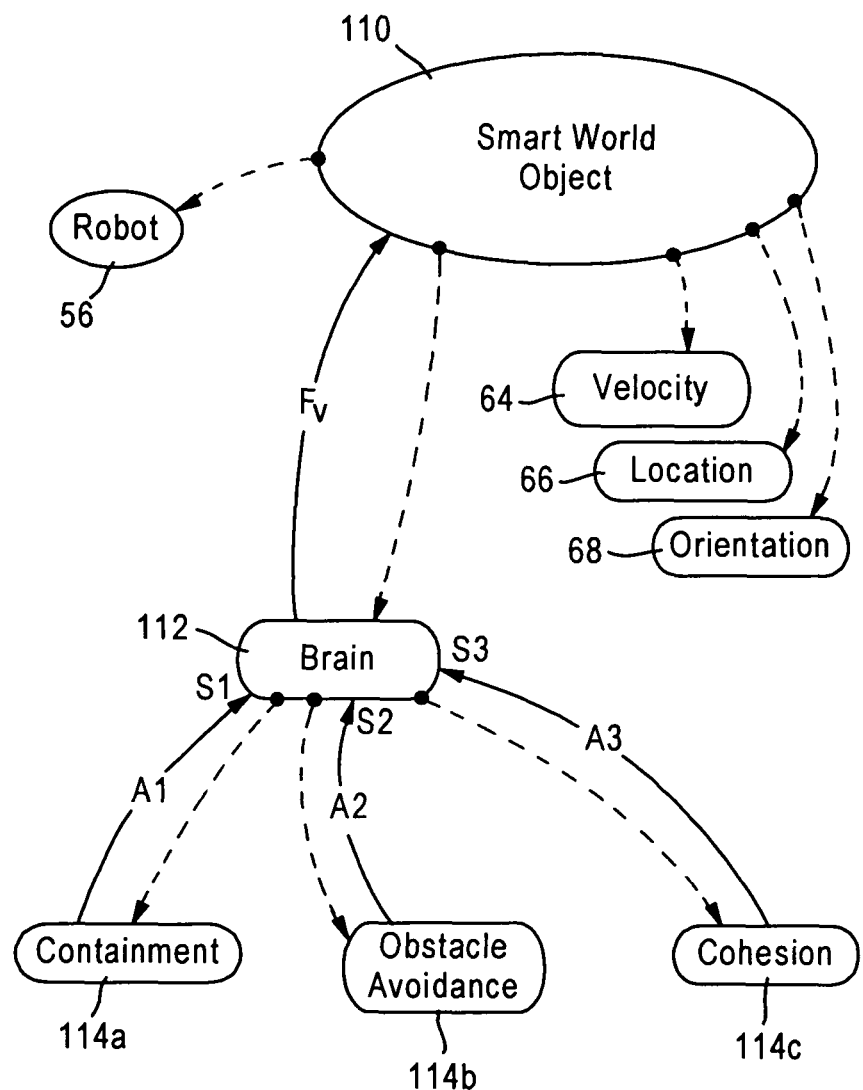
FIG. 9 is a diagram illustrating interactions between different objects from the world object database of FIG. 2 during execution of a decision.

FIG. 9 is a diagram illustrating operations by the robot object 56 and the brain 112 in deciding and implementing decisions and directives. The robot object 56 retrieves a three-dimensional velocity vector 64 from its smart world object 110; if the velocity vector 64 has a nonzero value, the robot object 56 reacts to the velocity vector 64 by attempting to repositioning itself to minimize the velocity vector. Once the robot object 56 has repositioned itself to minimize the velocity vector 64, the robot object retrieves from its smart world object 110 a location object 66 that specifies the location of the robot object 56 and an orientation object 68 that specifies the orientation of the robot object: the robot object 56 updates the location object 66 and the orientation object 68 in the smart world object 100. Hence, the robot object 56 interacts with its smart world object 110 by obtaining a vector for velocity, attempting to move in the direction and speed specified by the velocity vector by outputting movement directives to the mobility platform 22, and updating its resulting location and orientation in the smart world object 110. Note that the robot object 56 does not interact directly with the brain 112, and is not otherwise aware of the world 106 or world objects 104.

Hence, the motor complex 58 interacts with its associated control systems in the mobility platform by outputting movement directives to effect the changes specified by the corresponding velocity vector; the locator process 60 and sensors process 62 interact with the mobility platform via the interface 24 to determine the resulting effect of the motor complex 58 in implementing the velocity vector. For example, the locator process 60 interacts with the location element 23 to identify the location of the mobile node 12.

The brain 112 is a Java-based executable in the Java layer 34 and is configured for operating within a prescribed time cycle (i.e., a "thought interval"), for example every ten (10) seconds. Hence, in a given unit of time, the brain 112 considers the advice of all its reactions; as illustrated in FIG. 9, the brain 112 solicits advice from each of its reactions 114*a*, 114*b*, 114*c*, 114*d*, etc. Based on the set of reactions 114*a*, 114*b*, and 114*c* configured for the brain 114 for the given robot 56, each of the reactions 114*a*, 114*b*, and 114*c* supply corresponding advice elements (A1, A2, and A3) to the brain 112 as far as the corresponding action that should be carried out. The brain 112 applies any necessary influence factor (S1, S2, S3) to the respective advice elements (A1, A2, A3), and forms a "decision" (i.e., behavior) in the form of a new force vector (Fv) in the smart world object 110.

In forming the new force vector, the brain 112 may have a constraint such as a maximum length of a vector that can be effected during any thought interval. Hence, the brain 112 needs to determine how to logically divide the maximum length among all the reactions 114 using their respective influence factors. For example, the basic brain 132 determines the combined total of all advice elements (A1, A2, A3) from all the reactions as a combined vector (V) weighted according to their respective influence factors (V=A1*S1+A2*S2+A3*S3), and then scales the combined vector V using another matrix transform from its world object in order to fit the maximum vector constraints. In contrast, the reactive brain 134 first sorts the reactions by their influence, and then scales the reactions by their influence; the scaled reactions are then accumulated, in their sorting order (highest influence summed first), until the maximum vector constraint is reached.

As described above, each reaction 114 (e.g., 114*a*) make use of various properties within the world object database 100 to make their opinions (e.g., A1). For example, the cohesion reaction 114*c* may look at the current location object 66 (updated by the locator process 60) and/or the orientation object 68, plus signal strength or hop count objects to determine whether the robot 56 should move closer to (or further from) any one of the other mobile nodes 12.

Hence, the world object database 100 provides an object oriented model of all information necessary for the brain 112 (e.g., as illustrated in FIG. 9) to reach decisions in the time domain, and for the robot 56 to implement the decisions. Within certain thought intervals, the brain 112 decides what decision needs to be made based on the received opinions (A1, A2, A3) from the associated reactions 114. As such, the brain 112 would reconcile between conflicting opinions (e.g., avoiding a location to prevent destruction versus turning toward the location to improve signal reception). The brain 112 communicates its decision in the form of a force vector (Fv) which is stored in its smart world object 110 for use by another smart world object 110 (not shown) in modifying the velocity vector 64; alternately, the force vector (Fv) may be applied (e.g., added) directly to the stored velocity vector 64, resulting in an updated velocity vector 64. Also note that the force vector may directly applied, for example in the case of a robot 56 having a motor complex 58 configured for controlling a mechanical device configured for exerting a specified force. Regardless, the force vector is applied as needed based on the relevant transformation matrix (e.g., 130*a*) for a given world object.

A world factory 70 in the application layer 32 boots the system 30 into an initial state containing at least one smart world object 110, its brain 112 and associated reactions 114.

Note that the reactions 114 are abstract and universal, and world objects have transformations and vector maps. Hence, considering the reaction "obstacle avoidance", in the physical world a physical wall or other structure may be detected by a sonar or other sensor at a distance of 100 meters at a bearing of 350 degrees relative to the front of the moving node 12; the "obstacle avoidance" reaction would likely issue an opinion to move away from the structure. In contrast, in the radio frequency (RF) world, the obstacle avoidance reaction may detect the structure as a null point in the RF field. However, as far as the obstacle avoidance reaction is concerned, whether the sensor is detecting physical space or RF space is irrelevant; rather, the obstacle avoidance reaction is issuing an opinion to avoid an "obstacle" in the world, where the obstacle may map to different manifestations depending on the world (e.g, structure in physical space or RF null point in RF space).

Another feature of the reactions 114 is that they are general-purpose processes for performing low-level decisions that are evaluated by the brain 112. Since the reactions 114 are operating on a vector space specified in the world 106, and the vector space for a world 106 includes its own transformation, a world in RF space can be transformed between any of the other worlds 106 (physical space, hop count space, RF space, bandwidth, network address, etc.). In addition, multiple layers of transformations may exist including a basic transformation level that is contained within each world object 104. Hence, the world 106 is a kind of world object 104 that can contain world objects and has a vector transformation (e.g., coordinate transformation).

Other objects within the executable resources 30 that may execute operations for implementation of brain-generated force vectors in different vector spaces include routing objects 140, which are a type of brain 112 that update a next-hop routing table within the world object database 100 for a received packet. Hence, a received packet is routed based on the routing object 140 looking within the world object database 100 for a given objective (e.g., minimum latency); the routing object 140 would look in the latency space to identify the shortest distance to determine the next hop. Hence, the opinion Fv generated by the brain 112 is distributed to the appropriate object based on its association within the world object database.

As apparent from the foregoing, different reactions may have varying levels of influence over time; hence, as the brain 112 generates updated decisions (force vectors) that may become more drastic as urgent reactions identify more urgent opinions (e.g., in the case of collision avoidance).

Also note that a given network node may be configured for exerting a higher level of control over other network nodes, where the given network node is given a higher level of authority of all or some of the nodes, establishing a command hierarchy amongst the nodes.

Figure 10:
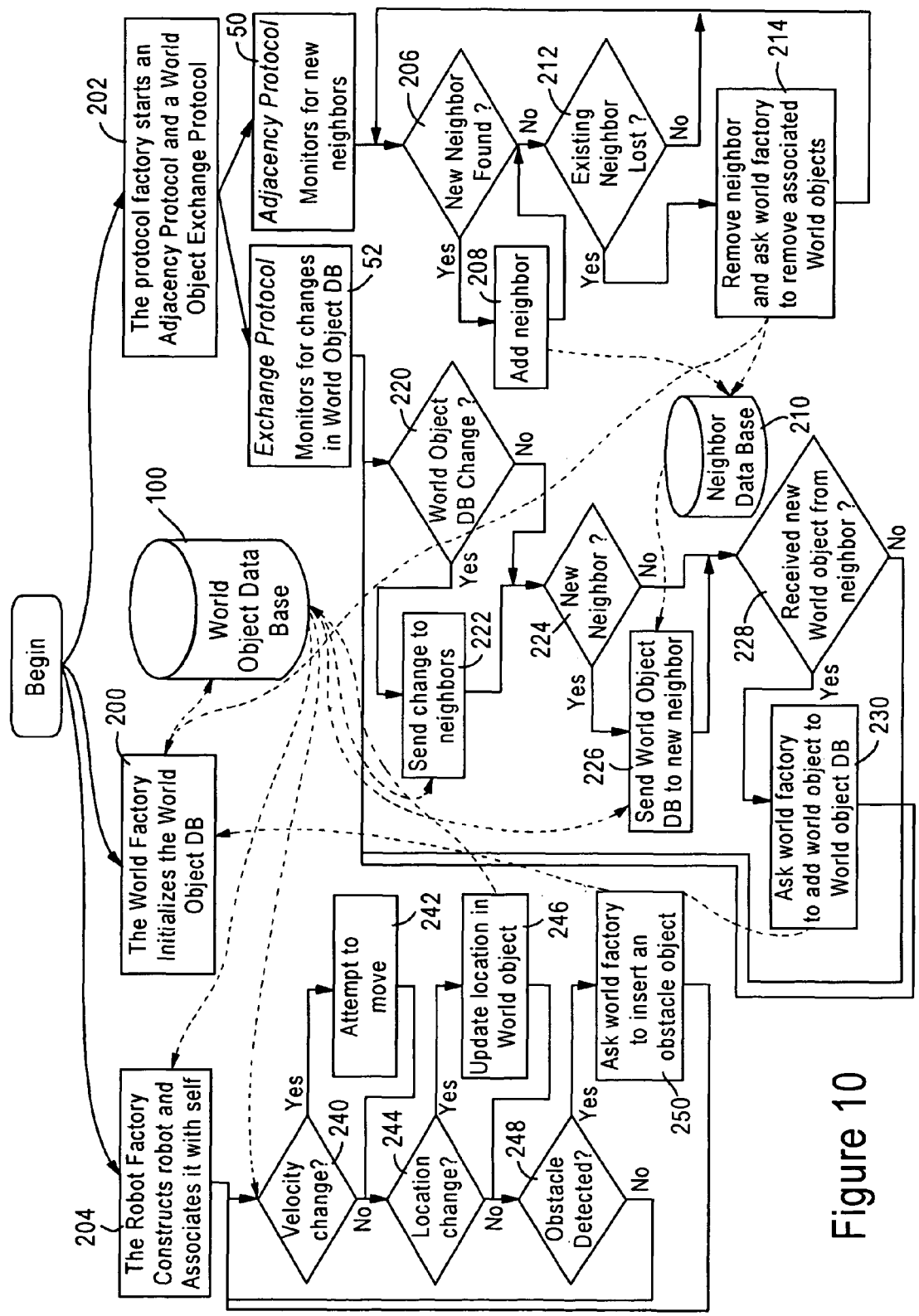
FIG. 10 is a diagram illustrating steps performed by the mobile nodes in establishing and maintaining the autonomous wireless mobile network, according to an embodiment of the present invention.

FIG. 10 is a diagram illustrating steps performed by the mobile node 12 in implementing autonomous organization of the mobile network 10, according to an embodiment of the present invention. The steps and operations described herein with respect to FIGS. 1-10 can be implemented as executable code stored on a computer readable medium (e.g., floppy disk, hard disk, NVRAM, EEPROM, CD-ROM, etc.), or propagated via a computer readable transmission medium (e.g., fiber optic cable, electrically-conductive transmission line medium, wireless electromagnetic medium, etc.).

As described above, the world factory 70 initializes the world object database 100 in step 200. The protocol factory 53 starts in step 202 an adjacency/neighbor discovery protocol process 50 and the world distribution protocol (i.e., world object exchange protocol) process 52. The robot factory 54 constructs in step 204 the robot process 56, and associates the robot process 56 with itself (i.e., the robot factory 54).

As described above, each of the processes operate independently 50, 52, and 56 of each other. For example, the adjacency protocol process 50 monitors for new neighboring network nodes using prescribed discovery operations (e.g., via Mobile IPv6 protocol): if in step 206 the adjacency protocol process 50 detects a new neighbor, the adjacency protocol process 50 adds in step 208 world objects that describe the neighboring network node 12; the world objects describing the neighboring network node are added to a neighbor database 210. As apparent from the foregoing, the neighbor database 210 is part of the world object database 100. If the adjacency protocol process detects in step 212 that an existing neighbor is lost (e.g., an identifying wireless signal cannot be detected by any network node for a neighbor identified in the neighbor database 210 after a prescribed interval), the adjacency protocol process 50 removes the neighbor from the neighbor database 210 in step 214, and sends a request for the world factory 70 to remove the world objects 104 associated with the lost neighbor.

Hence, the adjacency protocol process 50 establishes a network topology based on populating and maintaining the neighbor database 210 with world objects 104 associated with the neighboring network nodes.

The world object exchange protocol process 52 monitors for changes detected in the world object database 100. In response to detecting in step 220 a change in the world object database 100, the world object exchange protocol process 52 sends in step 222 the changed object to the neighbors specified in the neighbor database 210. If in step 224 a new neighbor is detected in the neighbor database 210, the world object exchange protocol process 52 sends the world object database 100 in step 226 to the new neighbor. If in step 228 the world object exchange protocol process 52 detects reception of a new world object from a neighboring network node 12 (i.e., a remote world object), the world object exchange protocol process 52 sends a request in step 230 for the world factory 70 to add the remote world object to the world object database 100.

The robot factory 54 initializes robot objects 56 in step 204, and the brain objects 112 begin periodic generation of behaviors based on received advice from reactions 114. For example, if in step 240 the robot object 56 detects a change in the velocity vector object 64 (see, e.g., FIG. 9), the robot object 56 may attempt to move in step 242 using its motor complex 58; if in step 244 the robot object 56 detects a change in the location of the mobile node 12 relative to the location object 66, the robot object 56 updates in step 246 the location object 66 stored in the world object database 100. If in step 248 the sensors process 62 of the robot process 56 detect an obstacle (e.g., based on prescribed signals from proximity sensors or radar signals exceeding a prescribed threshold), the robot object 56 sends a request in step 250 for the world factory 70 to insert an obstacle object in the world object database. Once an obstacle object has been added to the database 100, various reactions (e.g., evade 114d, avoidance 114g, etc.), may generate advice elements based on the prescribed associations.

According to the disclosed embodiment, mobile nodes as mobile access points can autonomously move about a given area (i.e., an infosphere) based on identifying an optimal location relative to topological information, network topology information, and link layer information. Hence, the mobile network is able to autonomously establish an optimal coverage that is both resilient to physical changes and relatively easy to deploy.

Note that numerous variations may be implemented in each network node while still providing advantages for the execution coordinated physical and network decisions for optimized operations with respect to both physical operations and wireless network operations. For example, the disclosed embodiment can be implemented where each network node is a non-mobile node (i.e., fixed node), where a change implemented by a network node according to the disclosed embodiment may involve changing from using a local area network (LAN) interface to a wide area network (WAN) interface, or changing a logical operation such as changing a next-hop route in order to change hop count attributes.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network node, the method comprising:

establishing by the network node a world object database in the network node and that stores world objects, the world objects representing respective attributes of an infosphere of a network that includes the network node, the world object database including smart world objects as a subclass of the world objects, the establishing including the smart world objects generating decisions based on evaluation of selected world objects;

adding by the network node, as world objects to the world object database, sensor objects from sensor data generated in response to detected attributes within the infosphere, the sensor objects including network node objects associated with the network node;

forming the network by the network node based on: discovery of other network nodes, adding second network node objects as world objects to the world object database and representing attributes of the other network nodes, and synchronizing the world objects with the other network nodes enabling the decisions by the network node to be coordinated with the other network nodes, wherein the network node and the other network nodes generate their respective decisions autonomously of each other; and performing by the network node a change in at least one of position, velocity, orientation, or wireless communication characteristics of the network node based on detecting a world object specifying a directive that is generated based on at least one of the decisions, for optimization of the network node relative to the other network nodes.

2. The method of claim 1, wherein the synchronizing of the world objects includes receiving remote world objects from the other network nodes, and storing the remote world objects as world objects in the world object database, the smart world objects generating updated decisions based on the remote world objects.

3. The method of claim 1, wherein the forming step includes discovering the other network nodes based on a mobile Internet Protocol (IP), and synchronizing the world objects according to the mobile IP.

4. The method of claim 1, wherein the establishing step includes instantiating execution of a world factory process configured for initializing the world object database and adding/removing the world objects to/from the world object database.

5. The method of claim 4, wherein the adding and performing steps are executed based on instantiating execution of a robot factory process configured for generating, for each smart world object, a corresponding robot object as one of the world objects, the adding step executed by a sensor process in at least one robot object and the performing step executed by a motor complex process in at least one robot object.

6. The method of claim 5, wherein the smart world objects own respective brain objects configured for generating the decisions, each brain object owning associated reaction objects configured for generating respective advice elements from associated world objects, each brain object configured for: determining the corresponding decision based on the associated advice elements relative to respective influence factors, and storing the decision as a vector object.

7. The method of claim 6, wherein the performing step includes sending the directive by the motor complex process to a mobility platform in the network node in an attempt to implement the vector object.

8. The method of claim 5, wherein each world object owns an associated three-dimensional shape object, the adding step including generating a request, by one of the robot objects, to the world factory for generation of an obstacle object in response to the sensor process detecting an obstacle in the infosphere.

9. The method of claim 4, wherein the establishing step includes adding world domains as a subclass of the world objects, each world domain configured for: (1) owning at least one world object, (2) having a native vector space, (3) encompassing a location object specified in the corresponding native vector space, and (4) having a transformational matrix configured for mapping the corresponding native vector space to other vector spaces used in the world object database, each world object configured for owning an associated three-dimensional shape object.

10. The method of claim 9, wherein the establishing step further includes adding waypoints as a subclass of the world objects, each waypoint representing an attribute relative to one of the vector spaces of the world object database.

11. The method of claim 10, wherein the establishing step further includes nesting a group of the world domains, each identifiable as child world domains, within at least one of the world domains identifiable as a parent world domain, the child world domains inheriting the attributes of the associated parent world domain.

12. A network node comprising:
a mobility platform configured for performing a change in at least one of position, orientation, or wireless communication characteristics of the network node based on a received directive, the mobility platform configured for generating sensor data in response to detection of physical attributes within an infosphere of a network that includes the network node; and
an executable routing resource configured for supplying the directive and receiving the sensor data, the executable routing resource including:
(1) a first independently executable resource configured for establishing within the network node a world object database that stores world objects representing respective attributes of the infosphere, the world object database including smart world objects as a subclass of the world objects and configured for generating decisions based on evaluation of selected world objects,
(2) a second independently executable resource configured for adding, as world objects to the world object database, sensor objects from the sensor data, the sensor objects including network node objects associated with the network node, and
(3) a third independently executable resource configured for forming the network based on: discovery of other network nodes, adding second network node objects as world objects to the world object database and representing attributes of the other network nodes, and synchronizing the world objects with the other network nodes enabling the decisions by the network node to be coordinated with the other network nodes, wherein the network node and the other network nodes generate their respective decisions autonomously of each other;
wherein the decisions generated by the smart world objects are used to generate at least one vector object that specifies the directive for use by the mobility platform, for optimization of the network node relative to the other network nodes.

13. The network node 12, wherein the third independently executable resource is configured for receiving remote world objects from the other network nodes for storage as world objects in the world object database, the smart world objects configured for generating updated decisions based on the remote world objects.

14. The network node of claim 12, wherein the third independently executable resource is configured for discovering the other network nodes based on a mobile Internet Protocol (IP), and synchronizing the world objects according to the mobile IP.

15. The network node of claim 12, wherein the first independently executable resource is a world factory process configured for initializing the world object database and adding/removing the world objects to/from the world object database.

16. The network node of claim 15, wherein second independently executable resource is a robot factory process configured for generating, for each smart world object, a corresponding robot object as one of the world objects, the robot object including a sensor process configured for adding the sensor objects from the sensor data, and a motor complex process configured for outputting the directives to the mobility platform based on parsing the respective vector objects.

17. The network node of claim 16, wherein the smart world objects own respective brain objects configured for generating the decisions, each brain object owning associated reaction objects configured for generating respective advice elements from associated world objects, each brain object configured for: determining the corresponding decision based on the associated advice elements relative to respective influence factors, and storing the decision as a vector object.

18. The network node of claim 17, wherein the motor complex process sends the directive to the mobility platform in the network node in an attempt to implement the vector object.

19. The network node of claim 16, wherein each world object owns an associated three-dimensional shape object, the robot object configured for generating a request to the world factory process for generation of an obstacle object in response to the sensor process detecting an obstacle in the infosphere.

20. The network node of claim 15, wherein the world factory process is configured for adding world domains as a subclass of the world objects, each world domain configured for: (1) owning at least one world object, (2) having a native vector space, (3) encompassing a location object specified in the corresponding native vector space, and (4) having a transformational matrix configured for mapping the corresponding native vector space to other vector spaces used in the world object database, each world object configured for owning an associated three-dimensional shape object.

21. The network node of claim 20, wherein the world factory process is configured for adding waypoints as a subclass of the world objects, each waypoint representing an attribute relative to one of the vector spaces of the world object database.

22. The network node of claim 21, wherein the world factory process is configured for nesting a group of the world domains, each identifiable as child world domains, within at least one of the world domains identifiable as a parent world domain, the child world domains inheriting the attributes of the associated parent world domain.

23. A network node comprising:
  means for establishing within the network node a world object database that stores world objects, the world objects representing respective attributes of an infosphere of a network that includes the network node, the world object database including smart world objects as a subclass of the world objects and configured for generating decisions based on evaluation of selected world objects;
  means for adding, as world objects to the world object database, sensor objects from sensor data generated in response to detected attributes within the infosphere, the sensor objects including network node objects associated with the network node;
  means for forming the network based on: discovery of other network nodes, adding second network node objects as world objects to the world object database and representing attributes of the other network nodes, and synchronizing the world objects with the other network nodes enabling the decisions by the network node to be coordinated with the other network nodes, wherein the network node and the other network nodes generate their respective decisions autonomously of each other; and
  means for performing a change in at least one of position, velocity, orientation, or wireless communication characteristics of the network node based on detecting a world object specifying a directive that is generated based on at least one of the decisions, for optimization of the network node relative to the other network nodes.

24. The network node of claim 23, wherein the means for forming is configured for synchronizing of the world objects based on receiving remote world objects from the other network nodes, and storing the remote world objects as world objects in the world object database, the smart world objects configured for generating updated decisions based on the remote world objects.

25. The network node of claim 23, wherein the means for forming is configured for discovering the other network nodes based on a mobile Internet Protocol (IP), and synchronizing the world objects according to the mobile IP.

26. The network node of claim 23, wherein the means for establishing includes a world factory process configured for initializing the world object database and adding/removing the world objects to/from the world object database.

27. The network node of claim 26, wherein the adding means and performing means are executed based on instantiating execution of a robot factory process configured for generating, for each smart world object, a corresponding robot object as one of the world objects, the adding means including a sensor process in at least one robot object and the performing means including a motor complex process in at least one robot object.

28. The network node of claim 27, wherein the smart world objects own respective brain objects configured for generating the decisions, each brain object owning associated reaction objects configured for generating respective advice elements from associated world objects, each brain object configured for: determining the corresponding decision based on the associated advice elements relative to respective influence factors, and storing the decision as a vector object.

29. The network node of claim 28, wherein the means for performing is configured for sending the directive by the motor complex process to a mobility platform in the network node in an attempt to implement the vector object.

30. The network node of claim 27, wherein each world object owns an associated three-dimensional shape object, the adding means configured for generating a request, by one of the robot objects, to the world factory for generation of an obstacle object in response to the sensor process detecting an obstacle in the infosphere.

31. The network node of claim 26, wherein the means for establishing is configured for adding world domains as a subclass of the world objects, each world domain configured for: (1) owning at least one world object, (2) having a native vector space, (3) encompassing a location object specified in the corresponding native vector space, and (4) having a transformational matrix configured for mapping the corresponding native vector space to other vector spaces used in the world object database, each world object configured for owning an associated three-dimensional shape object.

32. The network node of claim 31, wherein the means for establishing is configured for adding waypoints as a subclass of the world objects, each waypoint representing an attribute relative to one of the vector spaces of the world object database.

33. The network node of claim 32, wherein the means for establishing is configured for nesting a group of the world domains, each identifiable as child world domains, within at least one of the world domains identifiable as a parent world domain, the child world domains inheriting the attributes of the associated parent world domain.

34. A method for controlling a network node in a network, the method comprising:
  receiving by the network node detected attribute information that indicates a detected attribute relative to any one of the network node or at least one of other network nodes in the network, the detected attribute including any one of a communication attribute or a physical attribute;
  generating by the network node a movement directive based on the network node executing an optimization of routing metrics relative to the received detected attribute information and according to a prescribed routing protocol;
  the network node synchronizing the detected attribute information with the other network nodes enabling the movement directive generated by the network node to be coordinated with the other network nodes, wherein the network node and the other network nodes execute their respective optimizations of routing metrics autonomously of each other; and
  sending by the network node the movement directive to a mobility platform associated with the network node, the movement directive causing the mobility platform to implement the optimization by implementing a physical change for the network node.

35. The method of claim 34, wherein the receiving includes at least one of:
  receiving sensor information from the mobility platform and indicating the physical attribute; or
  receiving the detected attribute information from a second network node in the network via a wireless communications link.

36. The method of claim 34, wherein the physical change caused by the mobility platform includes changing any one of a position of the network node, velocity of the network node, or network interface utilization in the network node.

37. A network node of a network, the network node comprising:
  an executable resource configured for generating a movement directive based on executing an optimization of routing metrics relative to received network attribute information and according to a prescribed routing protocol, the received network attribute information indicating a detected attribute relative to any one of the network node or at least one of the other network nodes in the network, the detected attribute including any one of a communication attribute or a physical attribute, the executable resource further configured for synchronizing the detected attribute information with the other network nodes enabling the movement directive generated by the network node to be coordinated with the other network nodes, wherein the network node and the other network nodes execute their respective optimizations of routing metrics autonomously of each other; and
  a mobility platform configured for implementing the optimization by causing a physical change for the network node in response to the movement directive.

38. The network node of claim 37, wherein the mobility platform includes sensors configured for generating sensor information, the mobility platform providing the sensor information to the executable resource as the received network attribute information.

39. The network node of claim 37, wherein the physical change caused by the mobility platform includes changing any one of a position, velocity, or network interface utilization in the network node.

40. The method of claim 34, further comprising sending an update to another node in the network that identifies the movement directive generated by the network node.

41. The network node of claim 37, wherein the executable resource is configured for generating an update that is output by the network node to another node in the network, the update identifying the movement directive generated by the executable resource.

* * * * *